(12) United States Patent
Huang

(10) Patent No.: US 7,940,480 B2
(45) Date of Patent: May 10, 2011

(54) OPTICAL TRANSMISSION DEVICE

(75) Inventor: Yuan-Sheng Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 99 days.

(21) Appl. No.: 12/496,705

(22) Filed: Jul. 2, 2009

(65) Prior Publication Data

US 2010/0232014 A1    Sep. 16, 2010

(30) Foreign Application Priority Data

Mar. 16, 2009 (TW) ................. 98108438 A

(51) Int. Cl.
  *G02B 7/02* (2006.01)
  *G02B 7/04* (2006.01)
  *G02B 15/14* (2006.01)
(52) U.S. Cl. ........ 359/823; 359/824; 359/694; 359/695; 359/699; 359/701; 396/144
(58) Field of Classification Search .......... 359/694–704, 359/823, 824; 396/72–79, 82, 85; 348/92
  See application file for complete search history.

(56) References Cited

U.S. PATENT DOCUMENTS

| | | | | |
|---|---|---|---|---|
| 5,086,312 | A * | 2/1992 | Tanaka et al. | 396/75 |
| 5,225,941 | A * | 7/1993 | Saito et al. | 359/824 |
| 5,377,048 | A * | 12/1994 | Tada et al. | 359/823 |
| 5,748,394 | A * | 5/1998 | Shimazaki et al. | 359/823 |
| 6,108,107 | A * | 8/2000 | Suzuki | 358/474 |
| 6,654,557 | B2 * | 11/2003 | Kikuchi et al. | 396/144 |
| 7,397,618 | B2 * | 7/2008 | Hwang | 359/819 |
| 7,446,960 | B2 * | 11/2008 | Morinaga | 359/819 |
| 7,817,353 | B2 * | 10/2010 | Oh et al. | 359/695 |

* cited by examiner

*Primary Examiner* — Loha Ben
(74) *Attorney, Agent, or Firm* — Thomas|Kayden

(57) ABSTRACT

An optical transmission device including a driving unit having a transmitting member, a guide member, a frame, a clipping unit and a flexible member is disclosed. The clipping unit has a main clip engaging with one side of the transmitting member, and a sub-clip engaging with the other side of the transmitting member. The flexible member pushes the main clip to the sub-clip, so that the sub-clip radially and axially approaches the transmitting member.

12 Claims, 6 Drawing Sheets

OPTICAL TRANSMISSION DEVICE

CROSS-REFERENCE TO RELATED APPLICATION

This application claims priority of Taiwanese Application No. 098108438, filed on Mar. 16, 2009.

BACKGROUND OF THE INVENTION

1. Field of the Invention

This invention relates to an optical device, and more particularly, to an optical transmission device.

2. Description of the Related Art

When an optical device is adjusted to zoom or focus, an optical transmission device will drive a lens group to move to a proper position to achieve required magnification or a focal length.

Referring to FIG. 1, an optical transmission device 6 of an optical device is shown. A driving unit 61 drives a screw 62 to rotate by its axis Y, wherein a nut 63 moves to a base 64 along the axis Y and pushes a lens frame 65, so that the lens frame 65 can move downward and compress a spring 66. On the contrary, when the lens frame 65 is moving away from the base 64, the screw 62 reversely rotates and the nut 63 moves away from the base 64 along the axis Y, and then the spring 66 pushes the lens frame 65 to move away from the base 64. Although the lens frame 65 can be moved by the screw 62 to achieve the object of magnification adjustment and the focusing, the nut 63 entirely contacts the screw 62 when rotating, generating noise due to friction and shaking during the movement process.

To decrease noise generation, another optical transmission device 7 has been disclosed, as shown in FIG. 2. The optical transmission device 7 is controlled by the flexibility and the size of the plastic, to make a sub-clip 71 firmly close toward a main clip 72 and clip a screw 73, wherein the main clip 72 and the sub-clip 71 drives the lens frame 74 to move when the screw 73 rotates. Because both of the main clip 72 and the sub-clip 71 clip the screw 73, noise due to friction and shaking during the movement process is absorbed and noise is decreased. However, because the main clip 72 and the sub-clip 71 are along the radial direction of the screw 73, backlash is easily generated between the main clip 72 along the axis of the screw 73 and the threads of the screw 73, thus decreasing accuracy of the optical transmission device 7. While another optical transmission device has been disclosed, wherein a torsion spring is used for the sub-clip 71 firmly close toward the main clip 72, but accuracy of the optical transmission device is still decreased.

SUMMARY OF THE INVENTION

Therefore, the object of the present invention is to provide an optical transmission device which can decrease noise and eliminate backlash.

An optical transmission device of the present invention comprises a driving unit, a guide member, a frame, a clipping unit and a flexible member.

The driving unit has a teethed transmitting member and is disposed along an axis, and a driving member driving the transmitting member. The guide member is disposed in parallel with the transmitting member. The frame has a guide part connected to the guide member and moves along the axis. The clipping unit connects to the frame and has a main clip engaging with one side of the transmitting member, and a sub-clip rotatable to the main clip, engaging with the other side of the transmitting member. The flexible member is disposed on the frame and firmly pushes the sub-clip to the main clip, so that the transmitting member radially and axially approaches the sub-clip.

Thus, because the flexible member is disposed on the frame and firmly pushes the sub-clip to the main clip, so that the sub-clip radially and axially approaches the transmitting member, noise is decreased and backlash is reduced.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
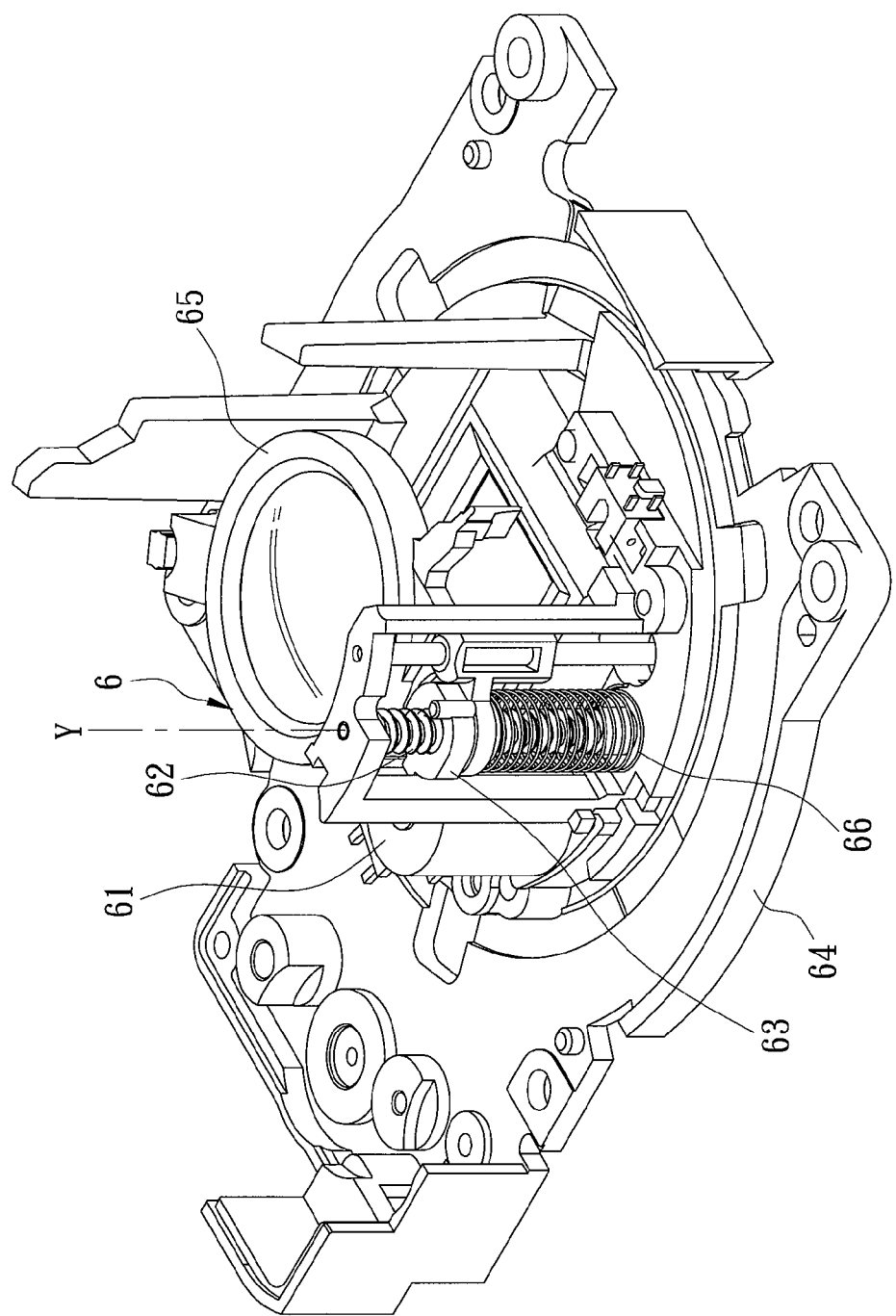
FIG. 1 is a three-dimensional view of a conventional optical transmission device.
Figure 2:
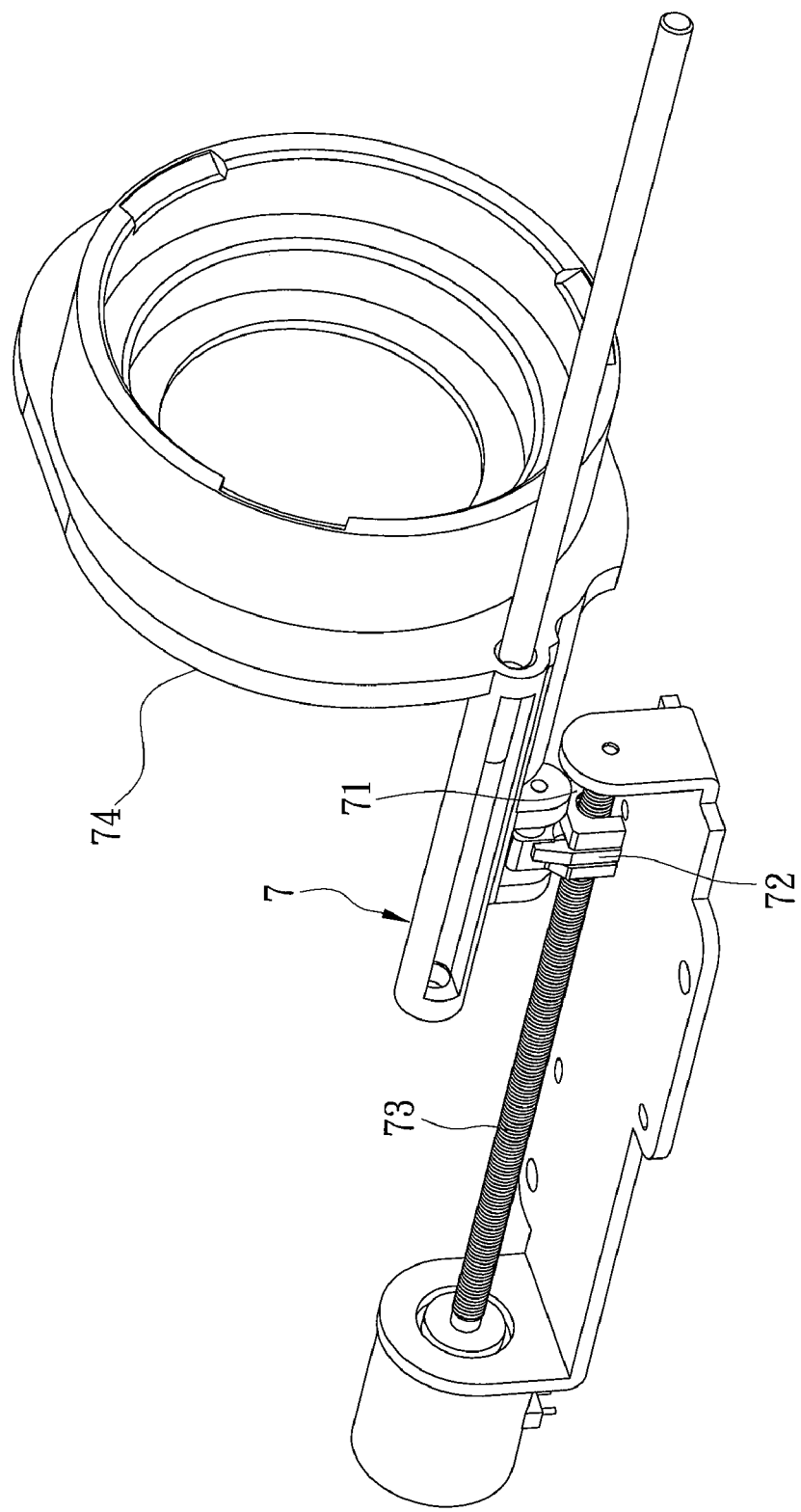
FIG. 2 is a three-dimensional view of another conventional optical transmission device.
Figure 3:
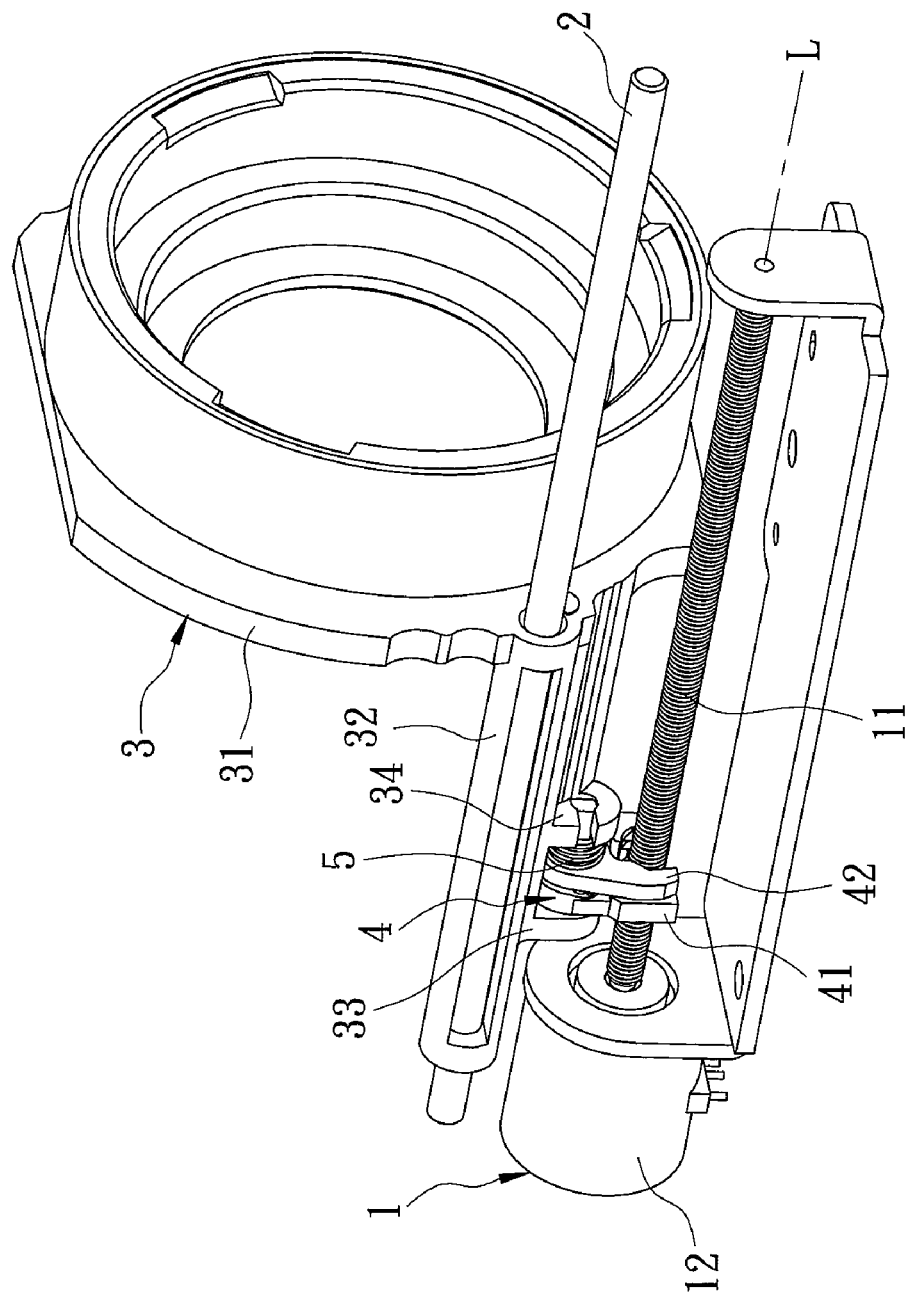
FIG. 3 is a three-dimensional view of a preferred embodiment of an optical transmission device of the invention.
Figure 4:
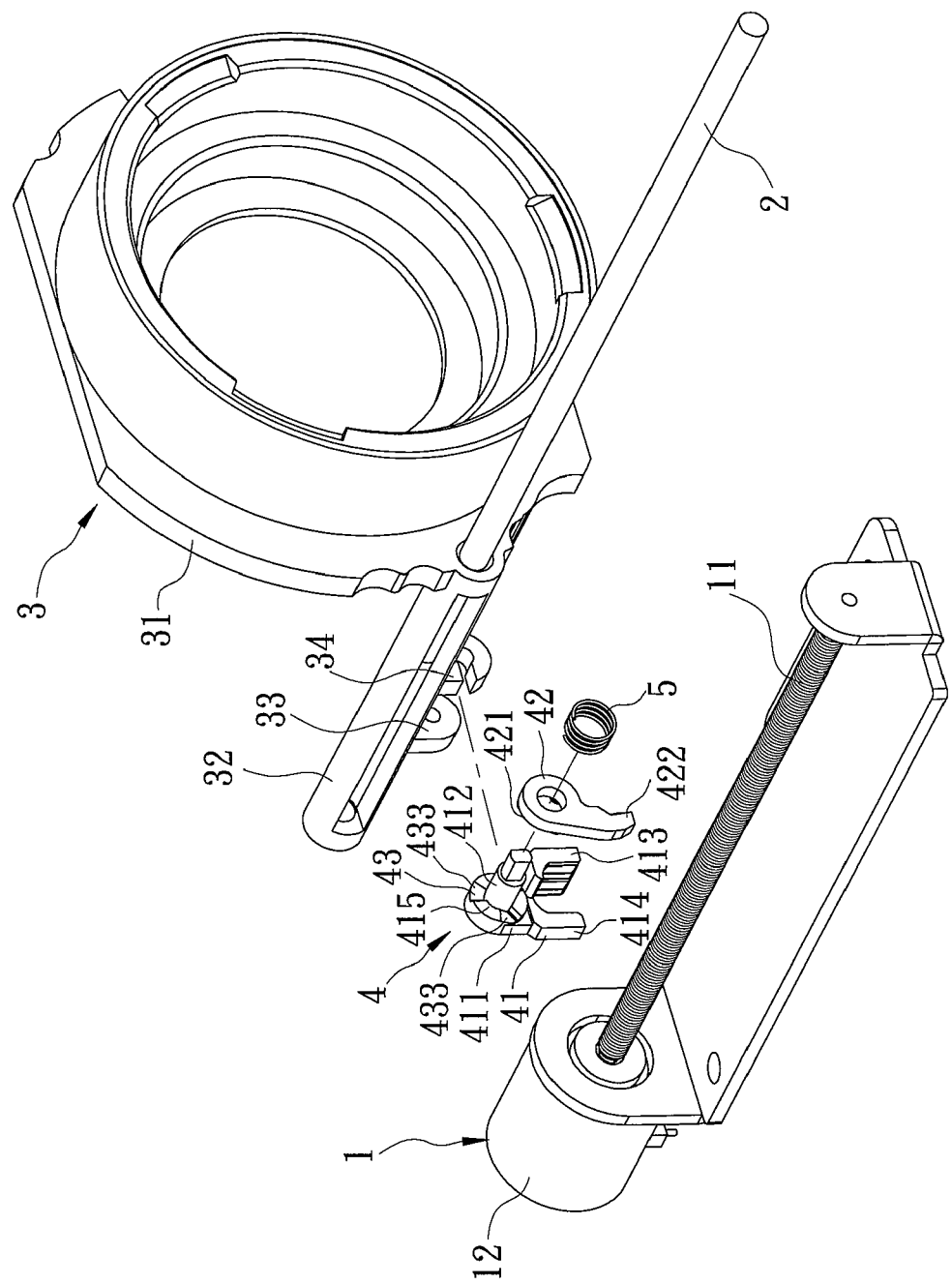
FIG. 4 is a fragmented exploded perspective view of a preferred embodiment of an optical transmission device of the invention.

Referring to FIG. 3 and FIG. 4, an optical transmission device comprises a driving unit 1, a guide member 2, a frame 3, a clipping unit 4 and a flexible member 5.

The driving unit 1 includes a transmitting member 11 having teeth along an axis L, and a driving member 12 driving the transmitting member 11. In this embodiment, the transmitting member 11 is a screw, and the driving member 12 drives the transmitting member 11 to rotate along an axis L.

The guide member 2 is disposed in parallel with the transmitting member 11. In this embodiment, the guide member 2 is a guide lever.

The frame 3 includes a bearing part for bearing an optical member, a guide part 32 extending from the bearing part 31 and disposed on the guide member 2 along the axis L, and a first ear and a second ear disposed separately on one side of the guide part 32 along the axis L.

Figure 5:
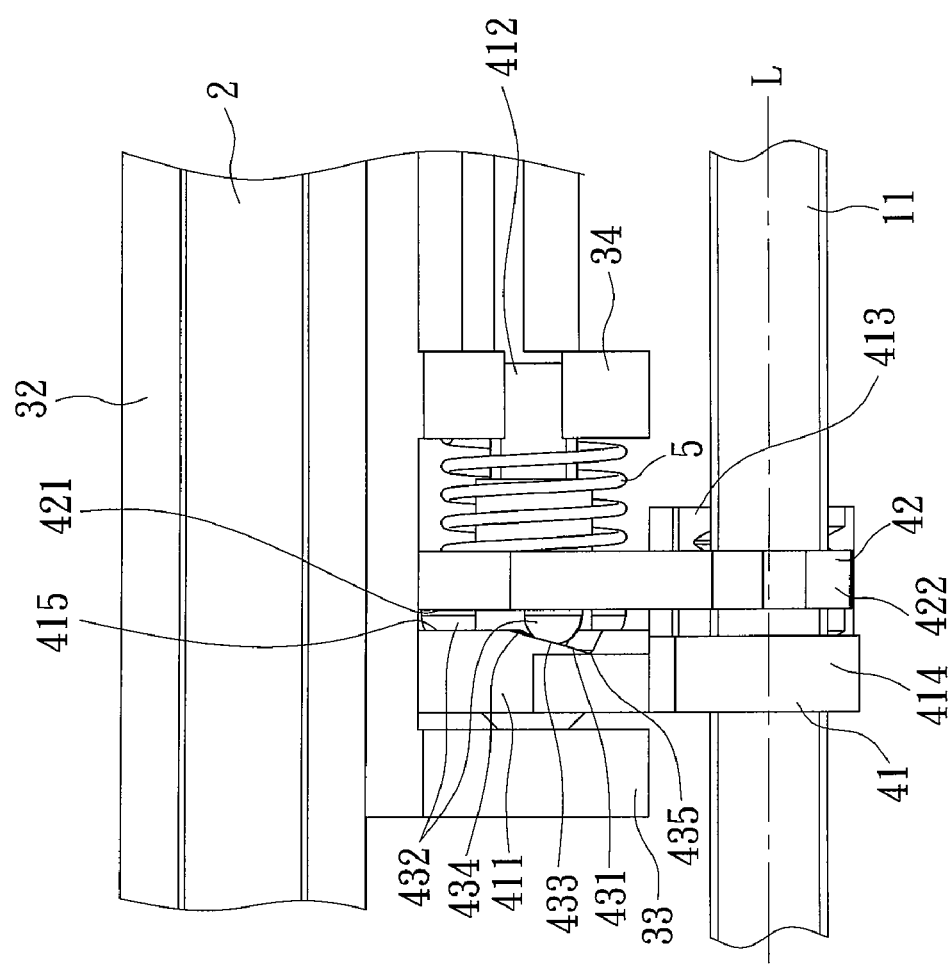
FIG. 5 is a sectional side view, illustrating a pushing member pushing and leaning against a tilt face.
Figure 6:
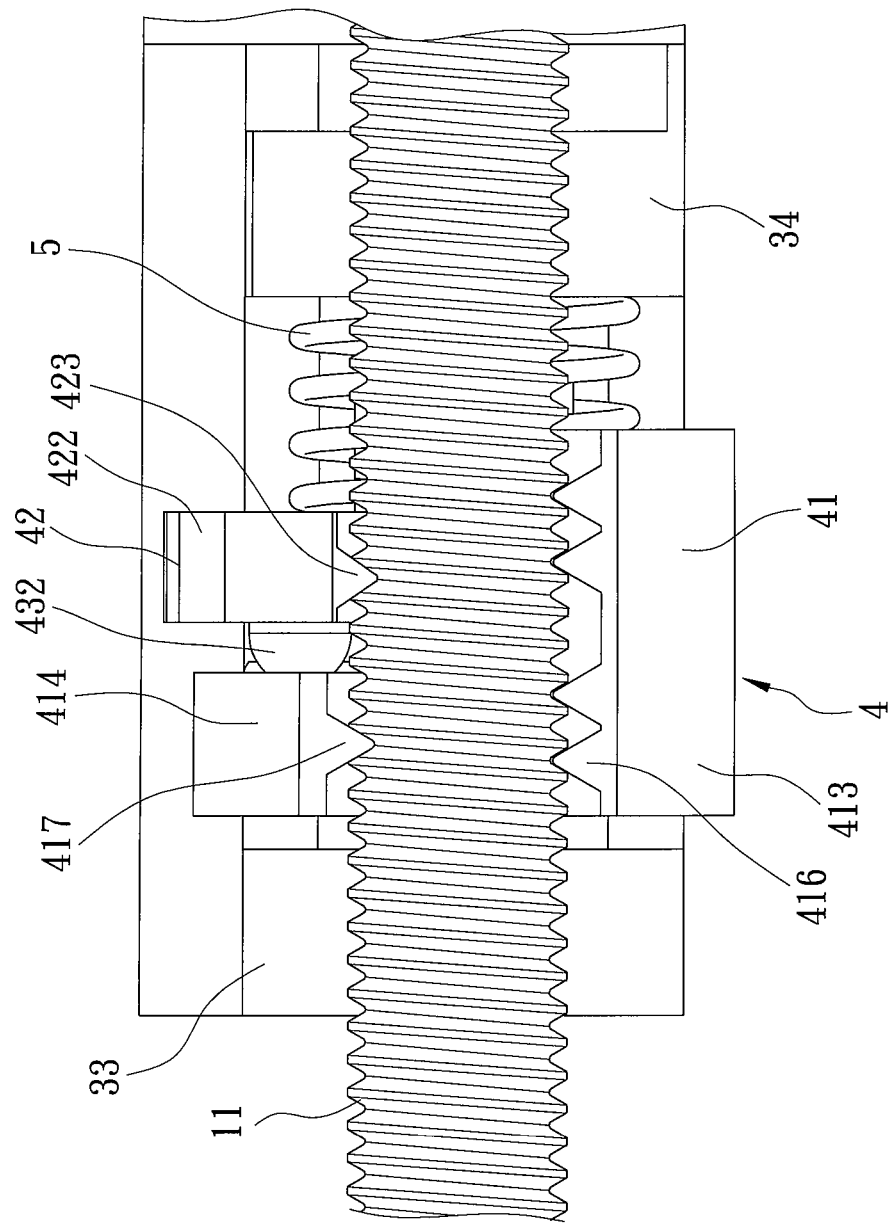
FIG. 6 is bottom view, illustrating the thread of a main clip and a sub-clip engaging with a transmitting member.

Referring to FIG. 4 to FIG. 6, the clipping unit 4 connects to the frame 3, and includes a main clip 41 engaging with one side of the transmitting member 11, a sub-clip 42 engaging with another side of the transmitting member 11 and rotatable around a pivot 412 to the main clip 41, and a cam module 43, wherein the main clip 41 can pivot on the first ear 33 and the second ear 34, and has a base body 411, the pivot 412 extending from the base body 411 along the axis L, a first side arm extending from the base body 411 and engaging with the transmitting member 11, and a second side arm 414 extending from the base body 411 and opposite to the first side arm 413. The base body 411 has a first face 415 facing to the sub-clip 42, and the ends of the pivot 412 pass through the first ear 33 and the second ear 34 separately. The sub-clip 42 can slide along the axis L and rotates around the pivot 412, and has a second face 421 facing to the first face 415, and a clamping arm 422 disposed opposite to the first side arm 413 and engaging with the transmitting member 11, wherein the first side arm 413 has a thread 416, the second side arm 414 has a thread 417, the clamping arm 422 has a thread 423, and the threads 416, 417, 423 all engage with the transmitting member 11.

The cam module 43 of the clipping unit 4 has a plurality of cam members 431 disposed around the first face 415 and every cam member 431 has a tilt face 433. A plurality of pushing members 432 which can slide, push and lean to the tilt face 433, wherein every tilt face 433 has a shallow end 434, and a deep end 435 lower than the shallow end 434 along the axis. The moving range of the pushing members 432 can be limited by the tilt face 433, wherein the moving range is the range that the sub-clip 42 is rotatable around the pivot 412 to the main clip 41. The pushing members 432 can be hemispherical or sliders, and in this embodiment, the pushing members are hemispherical. Note that the cam members 431 can also be disposed around the second face 421, and the pushing members 432 can also be disposed around the first face 415.

The flexible member 5 is clipped between the sub-clip 42 and the second ear 34, and firmly pushes the sub-clip 42 to the main clip 41, to make every pushing member 432 slide along the tilt face 433. The sub-clip 42 leans toward the transmitting member 11 radially and axially at the same time. Note that the flexible member 5 can be a flexible rubber or a compression spring. In this embodiment, the flexible member 5 is a compression spring.

Referring to FIG. 3 and FIG. 6, wherein operation of the optical transmission device is illustrated. Because the driving member 12 of the driving unit 1 drives the transmitting member 11 to rotate along an axis L, the transmitting member 11 can drive the frame 3 to move back and forth along the axis through the main clip 41 and the sub-clip 42.

Note that that the main clip 41 and the sub-clip 42 pivot on the first ear 33 and the second ear 34 separately, so that when the sub-clip 42 is pushed by the flexible member 5, it still leans toward the transmitting member 11 radially and axially.

Thus, the advantages of the preferred embodiment of the optical transmission device of the present invention are as follows:

1. Noise is decreased: because of disposition of the cam module 43, when the flexible member 5 pushes the main clip 41 and the sub-clip 42, the sub-clip 42 will move to the main clip 41 and then a radial pushing force will be generated against the transmitting member 11, the shake generated from the situation that the transmitting member 11 drives the main clip 41 and the sub-clip 42, is absorbed by the radial force generated from the flexible member 5 and the main clip 41 and the sub-clip 42, so that noise is decreased.

2. Backlash is decreased: because the flexible member 5 firmly pushes the sub-clip 42 to the main clip 41 along the axis, it eliminates the backlash generated between the threads 416, 417, 423 of the main clip 41, the sub-clip 42 and the transmitting member 11, to increase accuracy when the transmitting member 11 drives the main clip 41 and the sub-clip 42.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical transmission device, comprising:
   a driving unit, including a threaded transmitting member disposed along an axis, and a driving member to drive the transmitting member;
   a guide member, disposed in parallel with the transmitting member;
   a frame, including a guide part connecting to the guide member and sliding along the axis;
   a clipping unit, connecting to the frame, including a main clip engaging with one side of the transmitting member, and a sub-clip engaging with another side of the transmitting member, wherein the sub-clip is rotatable around a pivot extending from a base body of the clipping unit along the axis to the main clip; and
   a flexible member, disposed on the frame, firmly pushing the sub-clip to the main clip, so that the sub-clip radially and axially approaches the transmitting member.

2. The optical transmission device as claimed in claim 1, wherein the clipping unit further has a cam module, the cam module having a plurality of cam members disposed on one of the main clip and the sub-clip, wherein every cam member has a relative tilt face, the cam module further having a plurality of pushing members disposed on the other of the main clip and the sub-clip, wherein the pushing members have sliding contact with tilt faces, and wherein the flexible member firmly pushes the main clip to the sub-clip, so that every pushing member slides along the tilt faces.

3. The optical transmission device as claimed in claim 2, wherein the transmitting member is a screw, and the driving member of the driving unit drives the transmitting member to rotate along the axis.

4. The optical transmission device as claimed in claim 3, wherein; the frame further has a first ear and a second ear disposed separately along the axis; the main clip can pivot on the first ear and the second ear, the main clip having a first side arm extending from the base body and engaging with the transmitting member; and the sub-clip slides along the axis and rotates around the pivot, and has a clamping arm disposed opposite to the first side arm and engaging with the transmitting member.

5. The optical transmission device as claimed in claim 4, wherein the main clip has a first face facing to the sub-clip, the sub-clip has a second face facing to the first face, the cam members are disposed around the first face, and the pushing members are disposed around the second face.

6. The optical transmission device as claimed in claim 5, wherein every tilt face of the clipping unit has a shallow end, and a deep end lower than the shallow end along the axis, and the flexible member firmly pushes the pushing members to slide from the shallow end to the deep end.

7. The optical transmission device as claimed in claim 5, wherein the pushing members are hemispherical.

8. The optical transmission device as claimed in claim 4, wherein the main clip further has a second side arm extending from the base body and opposite to the first side arm, and every of the first side arm, the second side arm and the clamping arm has threads engaging with the threads of the transmitting member.

9. The optical transmission device as claimed in claim 4, wherein the flexible member clips between the sub-clip and the second ear.

10. The optical transmission device as claimed in claim 9, wherein the flexible member is a compression spring.

11. The optical transmission device as claimed in claim 3, wherein the guide member is a guide lever.

12. The optical transmission device as claimed in claim 3, wherein the frame further has a bearing part, bearing an optical member and connecting to the guide part.

* * * * *